US008567502B2

(12) United States Patent
O'Malley et al.

(10) Patent No.: US 8,567,502 B2
(45) Date of Patent: Oct. 29, 2013

(54) FILTRATION OF DANGEROUS OR UNDESIRABLE CONTAMINANTS

(75) Inventors: Edward J. O'Malley, Houston, TX (US); Bennett M. Richard, Kingwood, TX (US); Tianping Huang, Spring, TX (US); Min Huang, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 208 days.

(21) Appl. No.: 12/986,451

(22) Filed: Jan. 7, 2011

(65) Prior Publication Data

US 2011/0162837 A1 Jul. 7, 2011

Related U.S. Application Data

(63) Continuation-in-part of application No. 12/971,557, filed on Dec. 17, 2010, and a continuation-in-part of application No. 12/111,361, filed on Apr. 29, 2008, now Pat. No. 8,226,830, and a continuation-in-part of application No. 12/766,364, filed on Apr. 23, 2010, now Pat. No. 8,196,659, which is a continuation-in-part of application No. 12/180,111, filed on Jul. 25, 2008, now Pat. No. 7,703,531, which is a continuation-in-part of application No. 11/931,501, filed on Oct. 31, 2007, now Pat. No. 7,721,803, and a continuation-in-part of application No. 11/931,706, filed on Oct. 31, 2007, now abandoned, and a continuation-in-part of application No. 11/679,018, filed on Feb. 26, 2007, now Pat. No. 7,723,272, and a continuation-in-part of application No. 11/849,820, filed on Sep. 4, 2007, now Pat. No. 8,278,252, and a continuation-in-part of application No. 11/125,465, filed on May 10, 2005, now Pat. No. 7,343,972, said application No. 11/849,820 is a continuation-in-part of application No. 11/755,581, filed on May 30, 2007, now Pat. No. 7,550,413.

(60) Provisional application No. 60/845,916, filed on Sep. 20, 2006, provisional application No. 60/570,601, filed on May 13, 2004, provisional application No. 60/815,693, filed on Jun. 22, 2006.

(51) Int. Cl.
*E21B 43/34* (2006.01)

(52) U.S. Cl.
USPC .......................... 166/310; 166/266

(58) Field of Classification Search
None
See application file for complete search history.

(56) References Cited

U.S. PATENT DOCUMENTS

| 4,643,831 | A | 2/1987 | Fletcher |
|---|---|---|---|
| 4,931,195 | A | 6/1990 | Cao et al. |
| 5,518,996 | A | 5/1996 | Maroy et al. |
| 5,807,812 | A | 9/1998 | Smith et al. |
| 5,858,928 | A | 1/1999 | Aubert et al. |
| 5,964,295 | A | 10/1999 | Brown et al. |
| 6,211,120 | B1 | 4/2001 | Welch et al. |
| 6,258,859 | B1 | 7/2001 | Dahayanake et al. |
| 6,306,800 | B1 | 10/2001 | Samuel et al. |
| 6,447,577 | B1 | 9/2002 | Espin et al. |
| 6,506,710 | B1 | 1/2003 | Hoey et al. |
| 6,599,863 | B1 | 7/2003 | Palmer et al. |
| 6,605,570 | B2 | 8/2003 | Miller et al. |
| 6,613,720 | B1 | 9/2003 | Feraud et al. |
| 6,631,764 | B2 | 10/2003 | Parlar et al. |
| 6,821,434 | B1 | 11/2004 | Moore et al. |
| 6,838,005 | B2 | 1/2005 | Tepper et al. |
| 6,881,709 | B2 | 4/2005 | Nelson et al. |
| 6,919,029 | B2 | 7/2005 | Meng et al. |
| 7,036,585 | B2 | 5/2006 | Zhou et al. |
| 7,052,901 | B2 | 5/2006 | Crews |
| 7,060,661 | B2 | 6/2006 | Dobson, Sr. et al. |
| 7,081,439 | B2 | 7/2006 | Sullivan et al. |
| 7,084,095 | B2 | 8/2006 | Lee et al. |
| 7,131,491 | B2 | 11/2006 | Blauch et al. |
| 7,204,311 | B2 | 4/2007 | Welton et al. |
| 7,207,388 | B2 | 4/2007 | Samuel et al. |
| 7,211,320 | B1 | 5/2007 | Cooper et al. |
| 7,226,896 | B2 | 6/2007 | Audibert-Hayet et al. |
| 7,258,170 | B2 | 8/2007 | Nguyen et al. |
| 7,265,079 | B2 | 9/2007 | Willberg et al. |

(Continued)

FOREIGN PATENT DOCUMENTS

| WO | 2007041553 A1 | 4/2007 |
|---|---|---|
| WO | 2008036812 A2 | 3/2008 |

OTHER PUBLICATIONS

J. Hibbeler, et al., "An Integrated Long-Term Solution for Migratory Fines Damages," SPE 81017, SPE Latin American and Caribbean Petroleum Engineering Conference, Apr. 27-30, 2003, pp. 1-11, Port-of-Spain, Trinidad, West Indies.

(Continued)

*Primary Examiner* — Zakiya W Bates
(74) *Attorney, Agent, or Firm* — Mossman, Kumar & Tyler, PC

(57) ABSTRACT

Nanoparticle-treated substrates, such as screens, sand beds or proppant beds, may effectively filter and purify fluids such as waste water or fluids produced from a formation, as well as other liquids. When tiny contaminant particles in a fluid such as waste water flow contact the nanoparticle-treated substrate, the nanoparticles will capture and hold the tiny contaminant particles on the substrate due to the nanoparticles' surface forces, including, but not necessarily limited to van der Waals and electrostatic forces or other associative forces. Coating agents such as alcohols, glycols, polyols, vegetable oil, and mineral oils may help apply the nanoparticles to the surfaces of structures in the filter beds or packs.

20 Claims, No Drawings

(56) References Cited

U.S. PATENT DOCUMENTS

| | | | |
|---|---|---|---|
| 7,343,972 | B2 | 3/2008 | Willingham et al. |
| 7,347,266 | B2 | 3/2008 | Crews et al. |
| 7,550,413 | B2 | 6/2009 | Huang et al. |
| 7,595,284 | B2 | 9/2009 | Crews |
| 7,645,724 | B2 | 1/2010 | Crews |
| 7,721,803 | B2 | 5/2010 | Huang et al. |
| 7,723,272 | B2 | 5/2010 | Crews et al. |
| 2001/0023849 | A1 | 9/2001 | Robertson |
| 2003/0092581 | A1 | 5/2003 | Crews |
| 2003/0134409 | A1 | 7/2003 | Mallouk et al. |
| 2003/0234103 | A1 | 12/2003 | Lee et al. |
| 2004/0106525 | A1 | 6/2004 | Willberg et al. |
| 2004/0137209 | A1* | 7/2004 | Zeller et al. ............. 428/304.4 |
| 2004/0152601 | A1 | 8/2004 | Still et al. |
| 2005/0107265 | A1 | 5/2005 | Sullivan et al. |
| 2005/0252658 | A1 | 11/2005 | Willingham et al. |
| 2006/0027369 | A1 | 2/2006 | Baycroft et al. |
| 2006/0041028 | A1 | 2/2006 | Crews |
| 2006/0162928 | A1 | 7/2006 | Collins et al. |
| 2006/0211775 | A1 | 9/2006 | Crews |
| 2006/0211776 | A1 | 9/2006 | Crews |
| 2006/0258541 | A1 | 11/2006 | Crews |
| 2007/0056737 | A1 | 3/2007 | Crews et al. |
| 2007/0175196 | A1 | 8/2007 | Tepper et al. |
| 2008/0051302 | A1 | 2/2008 | Crews et al. |
| 2008/0060812 | A1 | 3/2008 | Huang et al. |
| 2008/0139419 | A1 | 6/2008 | Huang |
| 2009/0107673 | A1 | 4/2009 | Huang et al. |
| 2009/0111718 | A1 | 4/2009 | Gadiyar et al. |
| 2009/0312201 | A1 | 12/2009 | Huang et al. |
| 2009/0312204 | A1 | 12/2009 | Huang |
| 2010/0000734 | A1 | 1/2010 | Huang et al. |
| 2010/0108613 | A1 | 5/2010 | Crews et al. |
| 2010/0286000 | A1 | 11/2010 | Huang et al. |

OTHER PUBLICATIONS

J. B. Crews, "Internal Phase Breaker Technology for Viscoelastic Surfactant Gelled Fluids," SPE 93449, 2005 SPE International Symposium on Oilfield Chemistry, Houston, Texas Feb. 2-4, 2005.

Schlumberger, "ClearFRAC HT Surfactant" Datasheet, Apr. 2005.

C. H. Bivins, et al., "New Fibers for Hydraulic Fracturing," Oilfield Review, Summer 2005, pp. 34-43.

Schlumberger, "ClearFRAC HiPerm Surfactant" Datasheet, Aug. 2005.

R. Gdanski, et al., "Fracture Face Skin Evolution During Cleanup," SPE 101083, 2006 SPE Annual Technical Conference and Exhibition, San Antonio, Texas, Sep. 24-27, 2006.

J. A. Ayoub, et al., "New Results Improve Fracture Cleanup Characterization and Damage Mitigation," SPE 102326, 2006 SPE Annual Technical Conference and Exhibition, San Antonio, Texas, Sep. 24-27, 2006.

H. A. Nasr-El-Din, et al., "Lessons Learned and Guidelines for Matrix Acidizing with Viscoelastic Surfactants," SPE 102468, 2006 SPE Annual Technical Conference and Exhibition, San Antonio, Texas, Sep. 24-27, 2006.

H. A. Nasr-El-Din, et al., "Acid Fracturing of Deep Gas Wells Using a Surfactant-Based Acid: Long-Term Effects on Gas Production Rate," SPE 102469, 2006 SPE Annual Technical Conference and Exhibition, San Antonio, Texas, Sep. 24-27, 2006.

P. D. Nguyen, et al., "Controlling Formation Fines at Their Sources to Maintain Well Productivity," SPE 97659, SPE International Improved Oil Recovery Conference in Asia Pacific, Kuala Lumpur, Dec. 5-6, 2005; republished SPE Production & Operations, May 2007, pp. 202-215.

T. Huang, et al., "Nanotechnology Applications in Viscoelastic Surfactant Stimulation Fluids," SPE 107728, European Formation Damage Conference, Scheveningen, The Netherlands, 30 May 30-Jun. 1, 2007.

Clearfrac HT Web page, 2007, available at http://www.slb.com/content/services/stimulation/fracturing/clearfrac_ht.asp?

Clearfrac HT Web page, 2007, available at http://www.slb.com/content/services/stimulation/fracturing/clearfrac_hiperm.asp?

C. Lu, et al., "Chemical Modification of Multiwalled Carbon Nanotubes for Sorption of $Zn^{2+}$ from Aqueous Solution," Chem. Engr. Jrnl, 2008, pp. 462-468, vol. 139.

A.T. Heitsch, et al., "Multifunctional Particles: Magnetic Nanocrystals and Gold Nanorods Coated With Fluorescent Dye-dopedSilica Shells," Jrnl of Solid State Chem., 2008, pp. 1590-1599, vol. 191.

Martin Marietta Magnesia Specialties LLC, "Thioguard Brochure," available at http://www.magnesiaspecialties.com/Thioguard/thio_PDF/Thioguard.pdf.

C. Babe, et al., "New Insight to Desulfurization Process: Geometric Modeling of the Sulfidation of ZnO by $H_2S$," Prepr. Pap.-Am. Chem. Soc., Div. Petr. Chem. 2007, vol. 52, No. 2, pp. 31-34.

J. V. Stark, et al., "Nanoscale Metal Oxide Particles/Clusters as Chemical Reagents. Unique Surface Chemistry on Magnesium Oxide as Shown by Enhanced Adsorption of Acid Gases (Sulfur Dioxide and Carbon Dioxide) and Pressure Dependence," Am. Chem. Soc., Chem. Mater. 1996, vol. 8, pp. 1904-1912.

Y. Ding, et al., "Nanoscale Magnesium Hydroxide and Magnesium Oxide Powders: Control over Size, Shape and Structure via Hydrothermal Synthesis," Am. Chem. Soc., Chem. Mater. 2001, vol. 13, pp. 435-440.

* cited by examiner

FILTRATION OF DANGEROUS OR UNDESIRABLE CONTAMINANTS

CROSS-REFERENCE TO RELATED APPLICATIONS

This application is a continuation-in-part application of U.S. Ser. No. 12/971,557 filed Dec. 17, 2010, and is also a continuation-in-part application of U.S. Ser. No. 12/111,361 filed Apr. 29, 2008, issued Jul. 24, 2012 as U.S. Pat. No. 8,226,830 and is also a continuation-in-part application of U.S. Ser. No. 12/766,364 filed Apr. 23, 2010, issued Jun. 12, 2012 as U.S. Pat. No. 8,196,659 which is a continuation-in-part application of U.S. Ser. No. 12/180,111 filed Jul. 25, 2008 issued Apr. 27, 2010 as U.S. Pat. No. 7,703,531, which is a continuation-in-part application of U.S. Ser. No. 11/931,501 filed Oct. 31, 2007 issued May 25, 2010 as U.S. Pat. No. 7,721,803; U.S. Ser. No. 11/931,706 filed Oct. 31, 2007, which is now abandoned; U.S. Ser. No. 11/679,018 filed Feb. 26, 2007, issued May 25, 2010 as U.S. Pat. No. 7,723,272; and U.S. Ser. No. 11/849,820 filed Sep. 4, 2007, issued Oct. 2, 2012 as U.S. Pat. No. 8,278,252 the latter which claims the benefit of U.S. Provisional Patent Application 60/845,916 filed Sep. 20, 2006, and in turn is a continuation-in-part application of U.S. Ser. No. 11/125,465 filed May 10, 2005 issued Mar. 18, 2008 as U.S. Pat. No. 7,343,972, which in turn claims the benefit of U.S. Provisional Patent Application 60/570,601 filed May 13, 2004, and is a continuation-in-part application of U.S. Ser. No. 11/755,581 filed May 30, 2007 issued Jun. 23, 2009 as U.S. Pat. No. 7,550,413, which in turn claims the benefit of U.S. Provisional Patent Application 60/815,693 filed Jun. 22, 2006.

TECHNICAL FIELD

The present invention relates to methods and structures for inhibiting or removing contaminants from fluids, and more particularly relates, in one non-limiting embodiment, to methods and structures for filtering dangerous or undesirable contaminants from a fluid produced from a subterranean reservoir while the fluid is in the reservoir or wellbore.

BACKGROUND

Many methods and processes are known to clean, purify, clarify and otherwise treat fluids for proper disposal, consumption, use, and other needs. These methods include, but are not necessarily limited to, centrifugation and filtration to remove particulates, chemical treatments to sterilize water, distillation to purify liquids, decanting to separate two phases of fluids, reverse osmosis to desalinate liquids, electrodialysis to desalinate liquids, pasteurization to sterilize foodstuffs, and catalytic processes to convert undesirable reactants into useful products. Each of these methods is well-suited for particular applications and typically a combination of methods is used for a final product.

There are many different known technologies available for the sterilization of liquids. Adsorption, chemical treatments, ozone disinfection, and ultraviolet (UV) irradiation all perform very well for the removal of pathogenic microbes. However, each of these technologies has limitations, including overall efficacy, initial capital cost, operating cost, byproduct risk, necessary pre-treatment of liquid, hazardous compounds used or produced, and which thus must be properly disposed of, and other limitations.

Although chemical methods are the most widespread in use, they have a number of shortcomings. Such drawbacks include increasing microbiological adaptation to their destructive effects, safety hazards associated with chlorine use and storage, and environmental impact. UV is a popular treatment, but the liquid must be clear in order for it to be effective, and it does not break down any biofilm formation; it is also very expensive to install and operate. In industrial and municipal applications such as water and wastewater plants, the three most widely used methods of liquid sterilization are ozone treatment, chlorine treatment, and UV irradiation.

Desalination of liquids is highly useful for drinking water, biological fluids, medicines, chemicals, petroleum and its derivatives, and many other liquids. In addition, desalination of water would be beneficial since less than 0.5% of the Earth's water is directly suitable for human consumption, agricultural, or industrial uses. Consequently, desalination is finding increasing favor to produce potable water from brackish groundwater and seawater since it makes the other approximately 99.5% of the water available. There are five basic desalination methods: thermal, reverse osmosis, electrodialysis, ion exchange, and freezing. Thermal and freezing processes remove fresh water from saline leaving behind concentrated brine. Reverse osmosis and electrodialysis employ membranes to separate salts from fresh water. Ion exchange involves passing salt water over resins which exchange more desirable ions for less desirable dissolved ions. Only thermal and reverse osmosis processes are currently commercially viable. Even so, these two methods tend to be prohibitive due to their expense.

Further, fluids produced from subterranean formations, such as underground reservoirs, including but not necessarily limited to hydrocarbons such as crude oil and gas, and associatively produced water, may contain dangerous or undesirable contaminants and particulates. Produced water from the shale gas plays in North America is becoming especially problematic. Such contaminants may include, but are not necessarily limited to, heavy metals, heavy metal compounds, heavy metal complexes, radioactive metals, radioactive compounds, radioactive complexes and combinations thereof. These radioactive materials include, but are not necessarily limited to naturally occurring radioactive materials (NORM) such as uranium, thorium, potassium, radium, radon, lead and barium or strontium scales.

Heavy metals are defined herein to include, but are not necessarily limited to, mercury, arsenic, cadmium, uranium, plutonium, lead, vanadium, tungsten, iron, cobalt, copper, manganese, molybdenum, zinc, selenium, and combinations thereof. An alternative definition according to N. I. Sax, et al., *Hawley's Condensed Chemical Dictionary, Eleventh Edition*, Van Nostrand Reinhold, New York, 1987, p. 588 is a "metal of atomic weight greater than sodium (22.9) that forms soaps on reaction with fatty acids, e.g. aluminum, lead, cobalt." It will be understood that the heavy metals are generally present as ions, and thus removing heavy metals from water means removing heavy metal ions. In our lab tests, both arsenic and mercury are ions. Certain of these metals are well known to be dangerous and undesirable due to toxicity concerns including, but not necessarily limited to, mercury, arsenic, cadmium, uranium, and lead. Some of these materials may pose a health, safety and/or environmental (HS&E) risk, and thus exposure of these materials to humans and/or the environment should be minimized or avoided completely.

There is always a need to develop new structures and methods that will help perform these filtration and removal processes more cost effectively than their traditional counterparts. In the area of liquid filtration and purification, any technology that can lower the overall cost, simplify the process, increase safety and improve efficiencies would be very advantageous. It would thus be desirable if methods and/or structures would be devised to filter and purify liquids, such as wastewater and fluids produced during hydrocarbon recovery, using simple methods and devices.

SUMMARY

There is provided, in one form, a method for removing contaminants from a fluid that involves contacting the fluid containing at least one type of contaminants with a structure that includes a substrate and a plurality of nanoparticles coated on the substrate. The nanoparticles have a mean particle size of less than 500 nm, and may be alkaline earth metal oxides, alkaline earth metal hydroxides, alkali metal oxides, alkali metal hydroxides, transition metal oxides, transition metal hydroxides, post-transition metal oxides, post-transition metal hydroxides, piezoelectric crystals, and/or pyroelectric crystals. If the contaminant comprises a metal, the metal is different than the metal in the nanoparticles. That is, the nanoparticles are different from the contaminants. The nanoparticles are present in an amount effective to at least partially adsorb or otherwise remove the contaminants from or out of the fluid. The method further involves least partially adsorbing the contaminants from the fluid by an association of the nanoparticles with the contaminants, as will be described in more detail below.

There is additionally provided in another non-limiting embodiment a method for adsorbing or removing contaminants from a fluid that involves contacting the fluid containing contaminants of at least one type with a structure. The structure includes a substrate and a plurality of nanoparticles coated on the substrate. The particles have a mean nanoparticle size of less than 500 nm. The particles made be made of alkaline earth metal oxides, alkaline earth metal hydroxides, alkali metal oxides, alkali metal hydroxides, transition metal oxides, transition metal hydroxides, post-transition metal oxides, post-transition metal hydroxides, and/or piezoelectric crystals, pyroelectric crystals, mixtures thereof. If the contaminant comprises a metal, the metal is different than the metal in the particles. The particles on the substrate are present in an amount effective to at least partially remove the contaminants from the fluid. The substrate is selected from the group of structures consisting of proppants, gravel, beads, screens, slotted liners, packed and consolidated metal beads, foams, relative permeability additives, resins, rock formations, substrate particles having a mean particle size between about 45 to about 2000 microns, and combinations thereof. The method additionally involves at least partially removing the contaminants from the fluid by an association of the nanoparticles with the contaminants. The contaminants may include, but are not necessarily limited to, heavy metals, heavy metal compounds, heavy metal complexes, radioactive metals, radioactive compounds, radioactive complexes and/or combinations thereof.

Further there is provided in a different, non-restrictive version, a method for removing dangerous or undesirable contaminants from a fluid produced from a subterranean reservoir. The method includes placing at least one nanoparticle-coated substrate adjacent to or within the subterranean reservoir. The nanoparticles on the substrate comprise a plurality of particles having an average particle size of less than 1000 nanometers and include, but are not necessarily limited to, alkaline earth metal oxides, alkaline earth metal hydroxides, transition metal oxides, transition metal hydroxides, post-transition metal oxides, post-transition metal hydroxides, piezoelectric crystals, pyroelectric crystals. The method further involves contacting the nanoparticle coated substrate with a fluid originating from within the subterranean reservoir. The fluid may include a carrier selected from the group consisting of water, hydrocarbons, and mixtures thereof as well as at least one dangerous or undesirable contaminant. The method additionally includes at least partially removing the at least one dangerous or undesirable contaminant from the fluid by an association of the nanoparticles with the contaminant.

The particulate additives, also referred to herein as nano-sized particles or nanoparticles (e.g. MgO and/or $Mg(OH)_2$, and the like), appear to fixate, bind up, capture or otherwise associate contaminants, such as clay and non-clay particles, including charged and non-charged particles. Due at least in part to their small size, the surface forces (e.g. van der Waals and electrostatic forces) and chemisorptions of the nanoparticles help them associate, group or flocculate the tiny contaminant particles together in larger collections, associations or agglomerations. These forces appear to be stronger relative to the size of the particles, which may be due to the relatively high surface areas as a function of the very small volume. Such groupings or associations help capture the contaminants in place and keep them from moving and passing through with the liquid, associating them with or binding them to a substrate, resulting in a filtered or purified liquid. In many cases, the purifying ability of the particle pack may be improved by use of nano-sized particulate additives that may be much smaller in size than the contaminants.

The addition of alkaline earth metal oxides, such as magnesium oxide; alkaline earth metal hydroxides, such as calcium hydroxide; transition metal oxides, such as titanium oxide and zinc oxide; transition metal hydroxides; post-transition metal oxides, such as aluminum oxide; post-transition metal hydroxides; piezoelectric crystals and/or pyroelectric crystals such as ZnO and $AlPO_4$, to a substrate may be facilitated by a solvent-based fluid such as glycol, or oil-base fluid, e.g. mineral oil, may be used to treat the particle pack, such as a sand bed, which in turn is expected to filter, purify, clarify and otherwise clean the fluid. However, in some non-limiting embodiments, no solvent or other liquid is necessary or desired to help the nanoparticles adhere to or associate with the substrate that they coat. For instance, the surface forces (e.g. van der Waals and electrostatic forces) on the nanoparticles may be sufficient to keep them adhered to, stuck on or associated with the substrate.

DETAILED DESCRIPTION

Methods and compositions of nanoparticle-treated substrates such as proppant or sand beds have been discovered as useful to purify fluids such as waste water and fluids produced from subterranean formations. By "purify" is meant filtering, sequestering and otherwise removing dangerous and/or undesirable solid contaminants from the fluids. When tiny contaminant particles and/or heavy metal ions in a fluid such as waste water contact a nanoparticle-treated substrate, such as a screen or a sand bed, the nanoparticles will capture and hold the tiny contaminant particles and/or heavy metal ions to the substrate by the nanoparticles' surface forces, including but not necessarily limited to, van der Waals and electrostatic forces, and chemisorptions, thereby removing them from the fluid. The contaminants or impurities may include, but not necessarily be limited to, heavy metals, heavy metal compounds, heavy metal complexes (where heavy metals are defined as above), radioactive metals, radioactive compounds, radioactive complexes, sediments, soil particles, mining particles, water treatment particles, and the like. In one non-limiting embodiment the treated fluids are aqueous, by which is meant they contain water; in a non-restrictive, alternative embodiment the aqueous fluids are at least 50 weight % water, alternatively at least 30 wt % water. The purified water may thus be used as injection water in underground hydrocarbon reservoirs to effectively recover hydrocarbons, or as municipal water for continued purification for human consumption. Alternatively, the fluid may be a hydrocarbon fluid or a mixture of a hydrocarbon fluid with water, such as a water-in-oil (w/o) emulsion or an oil-in-water (o/w) emulsion. Many of these fluid types may be produced during the production of hydrocarbons from a subterranean reservoir. In the case of produced fluids, a goal is to filter, sequester, bind up or otherwise remove dangerous and/or otherwise undesirable components therefrom, in a non-limiting instance, radioactive or heavy metal-containing compounds or complexes while the fluids are still within the reservoir or the wellbore—that is, before they are removed from the well.

It has been discovered that nano-sized particles like magnesium oxide (MgO) may be used to remove contaminants such as clay and non-clay particles, including heavy metal-containing particulates, from liquids, that is, to remove, reduce or rid them from being present in the fluid, such as water, crude oil or gas. Some nano-sized particles, also called nanoparticles herein, not only have high surface areas compared to their small sizes, but also have relatively high surface charges that permit them to associate, link or connect other particles together, including other charged particles, but also other non-charged particles, and also to connect, bind or associate such contaminant particles with a substrate. In one non-limiting embodiment, these associations or connections between the contaminant particles and the nano-sized particles on a substrate are due to electrical attractions and other intermolecular forces or effects.

As will be shown, laboratory tests have demonstrated that relatively small amounts of MgO nanoparticles can remove and eliminate dispersed dangerous and/or undesirable contaminants such as mercury and arsenic. It is expected that charged and non-charged colloidal silicas will also be removed, as well as heavy metal-containing particles and radioactive particles. Other nanoparticles such as ZnO, $Al_2O_3$, zirconium dioxide ($ZrO_2$), $TiO_2$, cobalt (II) oxide (CoO), nickel (II) oxide (NiO), and pyroelectric and piezoelectric crystals may also be used in the methods and compositions herein.

The nanoparticles may be applied directly to and placed on and in a substrate, such as a screen, or particulate pack, such as a proppant or sand bed, typically by contacting the screen pack or bed with a fluid in which the nanoparticles are suspended. In one embodiment, a mixture of a coating agent and nanoparticles at least partially coat the selected substrate, proppant bed, sand bed or other porous media (substrate particles). If sand or gravel is at least partially coated with the coating agent and the nanoparticles, then the contaminants and impurities may be removed from the fluid, e.g. wastewater, and may be eliminated or suppressed thereby purifying the fluid.

The optional coating agent may be a carrier fluid that includes, but is not necessarily limited to, an alcohol, glycol, polyol, vegetable oil, fish oil and combinations thereof. One particularly suitable carrier fluid may be monopropylene glycol (PG). Alternatively, suitable coating agents include, but are not necessarily limited to, mineral oil or other hydrocarbon that accomplishes the purposes of the methods and compositions described herein. Specific, non-limiting examples of suitable mineral oils include ConocoPhillips PURE PERFORMANCE® Base Oils II or III, such as 225N, 600N, ULTRA-ST™ 3 and ULTRA-S™ 8; Penreco DRAKEOL® oils, such as DRAKEOL® 21, DRAKEOL® 35 and DRAKEOL® 600; and ExxonMobil Chemical mineral oils, such as EXXSOL® D80 and ISOPAR® M oils. It is expected that a filtering or purification product will include nanoparticles in the coating agent oil, for instance about 15 wt % nano-sized MgO particles in the Drakeol® 600 mineral oil. It has been discovered that during contacting with a substrate such as a screen, mixing with the particles of the pack or bed, the nanoparticles in oil, glycol, or other carrier will plate out on or at least partially coat the substrate surfaces and particles. How much coating of the substrate surfaces and particles that occurs is concentration dependant, based on both the amount of particles, e.g. sand, used and the amount of nanoparticles used. In a non-limiting example, the carrier fluid may additionally have a surfactant present, such as an oil-wetting surfactant like sorbitan monooleate (i.e. SPAN 80 from Uniqema), to improve and/or enhance the oil-wetting of the pack or bed substrate particles by the nanoparticles. In another non-limiting example, the presence of a surfactant may preferentially reduce the thickness of the DRAKEOL® 600 mineral oil layer on the substrate surface or sand pack particles. Reduced oil layer thickness may enhance nanoparticle exposure on the substrate or sand or ceramic particles. Use of lower viscosity mineral oils, such as DRAKEOL® 15, DRAKEOL® 18 or EXXSOL® D80 can also be used to reduce oil layer thickness. Other agents besides SPAN 80 may be employed to optimize the oil coating or wetting or thickness on the substrate surface or sand pack or ceramic bed particles, agents such as: sorbitan esters, ethoxylated sorbitan esters, ethoxylated alcohols, ethoxylated alkyl-phenols, alkyl-dicarboxylics, sulfosuccinates, phospholipids, alkylamines, quaternary amines, alkyl-siloxanes, and the like. It is not necessary that a resin be used as a coating agent or binder, and in one non-limiting embodiment, no resin is used.

It is theorized that the nanoparticles remain on the substrate surfaces or particles of the particle pack primarily by electrostatic and other charges between the nanoparticle and substrate or particle surfaces, however, other attractions or coupling forces may exist to initially and over the long-term keep the nanoparticles coated on the pack or bed substrate particles. The inventors do not want to be limited to any particular theory. It is suspected that in most conditions the carrier fluid only assists the initial coating process of the nanoparticles on to the substrate particles of the pack or bed. However, other agents may be added to the carrier fluid that may further enhance the initial and/or long-term nanoparticle attraction to the substrate surfaces, sand (silica or quartz or feldspars), glass, ceramic and the like particles.

Nano-sized particles of alkaline earth metal oxides, alkaline earth metal hydroxides, alkali metal oxides, alkali metal hydroxides, transition metal oxides, transition metal hydroxides, post-transition metal oxides, and post-transition metal hydroxides, piezoelectric crystals, pyroelectric crystals, and mixtures thereof have been discovered to have particular advantages for filtering out and binding up impurities and contaminants, thereby purifying fluids.

Magnesium oxide particles and powders have been suitably used to filter fluids herein. However, it will be appreciated that although MgO particles are noted throughout the description herein as one representative or suitable type of alkaline earth metal oxide and/or alkaline earth metal hydroxide particle, other alkaline earth metal oxides and/or alkaline earth metal hydroxides and/or transition metal oxides, transition metal hydroxides, post-transition metal oxides, and post-transition metal hydroxides, piezoelectric crystals, pyroelectric crystals, may be used in the methods and compositions herein. Additionally, the alkali metal oxides and/or hydroxides may be used alone or in combination with the alkaline earth metal oxides and hydroxides, and/or together with one or more transition metal oxide, transition metal hydroxide, post-transition metal oxide, post-transition metal hydroxide, piezoelectric crystal, and pyroelectric crystal.

By "post-transition metal" is meant one or more of aluminum, gallium, indium, tin, thallium, and bismuth. In another non-limiting embodiment herein, the nano-sized particles are oxides and hydroxides of elements of Groups IA, IIA, IVA, IIIB and IIIB of the previous IUPAC American Group notation. These elements include, but are not necessarily limited to, Na, K, Mg, Ca, Ti, Zn and/or Al. In one non-limiting embodiment, there is an absence of alumina (aluminum oxide) and/or aluminum hydroxide from the suitable nanoparticles.

The nano-sized particulate additives herein may also be piezoelectric crystal particles (which include pyroelectric crystal particles). Pyroelectric crystals generate electrical charges when heated and piezoelectric crystals generate electrical charges when squeezed, compressed or pressed.

In one non-limiting embodiment, specific suitable piezoelectric crystal particles may include, but are not necessarily limited to, ZnO, berlinite ($AlPO_4$), lithium tantalate ($LiTaO_3$), gallium orthophosphate ($GaPO_4$), $BaTiO_3$, $SrTiO_3$, $PbZrTiO_3$, $KNbO_3$, $LiNbO_3$, $LiTaO_3$, $BiFeO_3$, sodium tungstate, $Ba_2NaNb_5O_5$, $Pb_2KNb_5O_{15}$, potassium sodium tartrate, tourmaline, topaz and mixtures thereof. The total pyroelectric coefficient of ZnO is −9.4 $C/m^2K$. ZnO and these other crystals are generally not water soluble.

In one non-restrictive explanation, when the substrate, particle pack or sand bed contains very small pyroelectric crystals, such as nano-sized ZnO, the pyroelectric crystals may be heated and/or pressed and high surface charges (relative to particle volume) are generated. The surface charges may be generated or produced if the fluid is under pressure. These surface charges permit the crystal particles to associate, link, connect or otherwise relate the impurities and contaminants together to bind them together and also to the adjacent surface, surrounding particle pack or sand surfaces. The association or relation of the impurities or contaminants is thought to be very roughly analogous to the crosslinking of polymer molecules by crosslinkers, in one non-limiting image.

In another non-limiting embodiment, the nano-sized solid particulates and powders useful herein include, but are not necessarily limited to, alkaline earth metal oxides or alkaline earth metal hydroxides, or mixtures thereof. In one non-limiting embodiment, the alkaline earth metal in these additives may include, but are not necessarily limited to, magnesium, calcium, barium, strontium, combinations thereof and the like. In one non-limiting embodiment, MgO may be obtained in high purity of at least 95 wt %, where the balance may be impurities such as $Mg(OH)_2$, CaO, $Ca(OH)_2$, $SiO_2$, $Al_2O_3$, and the like.

In an additional non-restrictive version, the particle size of the additives and agents ranges between about 4 nanometers independently up to less than 1000 nanometers. In another non-limiting embodiment, the particle size ranges between about 4 nanometers independently up to less than 500 nanometers. In another non-restrictive version, the particles may have a mean particle size of about 250 nm or less, alternatively about 100 nm or less, and in another possible version about 50 nm or less, alternatively 40 nm or less. Any of these lower thresholds may be combined with any of the upper thresholds to form an acceptable size range; such is also meant by the term "independently".

The amount of nano-sized particles in the sand or ceramic bed pack material may be from about 1 pound of nanoparticles for about 200 pounds to 5000 pounds of sand. It will be appreciated that any other unit of weight may be used, for instance, from about 1 gram of nanoparticles for about 200 grams to 5000 grams of sand. In an alternate embodiment, the nanoparticles are present in an amount of from about 1 part by weight nanoparticles to about 1000 independently to about 2000 parts sand or ceramic pack material.

If the substrate is a solid surface, in a non-limiting example the surface of a screen or the like, the amount of nanoparticles per unit area of the surface may range from about 1 mg to about 1000 mg of nanoparticles per square ft of surface (about 11 mg to about 11,000 mg per $m^2$). In a different non-limiting embodiment the amount of nanoparticles per unit area of the surface may range from about 1 mg independently to about 200 mg of nanoparticles per square ft of surface (about 11 mg to about 2200 $mg/m^2$)

Alternatively, if the substrate is a foam, in another non-restrictive version the amount of nanoparticles per volume of foam may range from about 1 mg to about 1000 mg of nanoparticles per 1 cubic in. of foam (about 0.06 to about 61 mg nanoparticles per cubic centimeter). In another non-limiting embodiment the amount of nanoparticles per volume of foam may range from about 1 mg independently to about 200 mg of nanoparticles per 1 cubic in. of foam (about 0.06 to about 12.2 mg of nanoparticles per cubic centimeter).

The nano-sized particles herein may be added to water, a glycol, alcohol, polyol, olefin, vegetable oil, fish oil, or mineral oil, or mixtures of these, as the carrier fluid—a combination which also serves to initially coat, or at least partially coat, the nanoparticles to the surface, sand or ceramic. In another non-limiting embodiment, the nano-sized particles coated on equipment surfaces, ceramic particles or sand herein may be added to an aqueous fluid during a treatment.

The sand, ceramic, glass or other substrate particles of the pack or bed may have a mean particle size of the particles of from about 10 mesh to about 325 mesh (about 2000 microns to about 45 microns), in one non-limiting embodiment. Alternatively, the substrate particles may range in size from about 20 mesh independently to about 200 mesh (from about 850 microns independently to about 75 microns). The substrate particle size range may be wide, such as from about 40 mesh to about 200 mesh (from about 425 microns to about 250 microns), or the particle size range may be relatively narrow, such as from about 20 mesh to about 40 mesh (from about 850 microns to about 425 microns).

In another non-limiting version, the nanoparticles may be coated on equipment surface, ceramic or sand at a supplier facility before use in a fluid purifying treatment or introduced downhole adjacent a subterranean formation. In a different non-limiting embodiment, a select portion of the equipment surface, sand or ceramic may be lightly coated with carrier fluid containing nanoparticles during a treatment, or before introduction of the equipment downhole or before a fluid purification or clarification treatment. It has been discovered that PG-coated nanoparticles tend to be attached to, adhered to, or bound to the ceramic particles or sand. The nanoparticles can be directly mixed with the substrate particles without liquid binding agents to form a pack inside of downhole tools. The nanoparticle coated proppants can be pumped as frac-pack and gravel pack. The nanoparticle slurry can also be pumped into formation matrix in near wellbore region. The nanoparticles may also be placed on downhole rock formations or the formation matrix and other structures.

Laboratory tests have shown that 35 nanometer MgO particles and monopropylene glycol (PG) coated on a 20/40 mesh (850/425 micron) sand pack can successfully remove contaminants from wastewater.

While the methods and structures herein are sometimes described typically herein as having use in wastewater fluids, such as those from paper processing, the compositions and methods are also expected to be useful in oil field recovery, e.g. produced formation water, exhausted drilling muds, metalworking, agricultural operations, mining operations, environmental remediation operations, waste disposal operations, cleaning operations, manufacturing operations and the like. As noted the methods and structures described herein are useful to filter or remove dangerous or undesirable contaminants from a fluid produced from a subterranean reservoir, such as produced water and/or hydrocarbons. The substrates or particle bed is placed adjacent to or within the subterranean reservoir, such as within the wellbore through and adjacent the reservoir and perforations and/or fractures extending from the wellbore into the reservoir.

The methods and structures described herein may be combined with other conventional methods and structures including, but not necessarily limited to mechanical filtration using mechanical filters, chemical filtration and other viable means and structures to remove the surfaces, sand or gravel having the contaminants adhered, bound or associated therewith to final destination or disposal site. Further, in some non-limiting embodiments, the substrate surfaces or particle or sand bends may be regenerated by the contact therewith by a separate acidic solution to dissolve the nanoparticles and flush away the contaminants.

It will also be appreciated that the methods described herein need not completely remove all contaminants to be considered successful, although such complete removal is desirable. The methods may remove 90% or more of the contaminants, alternatively 95% or more of the contaminants, and in another non-limiting embodiment 99% or more of the contaminants.

The acidic stripping fluid, once it removes the nanoparticles and trapped/fixated sediments, would need appropriate conditioning and/or disposal. If the trapped sediments are simply river sediments, like soil particles, then the acidic waste could simply be neutralized (for instance with sodium bicarbonate (baking soda) or other common material), and would then be a non-hazardous material, relatively easy to dispose of. However, if there are heavy metals and the like, for instance, toxic components to the sediments that were trapped or captured (e.g. toxic elements, compounds, contaminated soil particles, etc.) by the fixation of the nanoparticles, then once stripped by the acidic water, the stripping fluid would need appropriate handling, conditioning and/or disposal.

The method and structures discussed herein will be further described with respect to the following specific Examples which are not meant to limit the method and structures, but rather to further illustrate a few of the various embodiments.

EXAMPLES

Laboratory sand pack tests (20/40 mesh or 850/425 micron sand) with and without nanoparticles treatment show that nanoparticle-treated sand packs may remove contaminants a simulated produced water or wastewater.

The mercury and arsenic solutions used in the experiments were National Institute of Standards and Technology (NIST) standard solutions. Mercury was in the form of mercury nitrate: $Hg(NO_3)_2$. Arsenic was in the form of arsenic acid: $H_3AsO_4$.

Example 1

Removal of Mercury 10 ppm Hg in water was flowed through two 10 inch (25 cm) long 20/40 mesh (850/425 micron) sand packs. One is the base 20/40 mesh sand; the other is the same 20/40 mesh sand but coated with MgO particles having a mean particle size of 35 nm (available from Baker Hughes as ConFINE™ particles). Before the coating, the nanoparticles are mixed with mineral oil as slurry in one pound (0.45 kg) of the 35 nm MgO nanoparticles in one gallon (3.8 liters) of 600N mineral oil, then one milliliter the slurry mixed with 100 grams of the 20/40 mesh sand to form the column of treated porous media. This is about 0.1% by weight. The effluents of second and third pore volumes (PVs) were collected for analyzing concentrations of Hg. The results are shown in Table I below where it may be seen that the treated packs reduced the amount of Hg present.

TABLE I

Removal of Mercury from Water Through Nanoparticle Coated Porous Media

| Sample | Concentration (ppm) |
| --- | --- |
| Base 10 ppm PV2 | 6.8 |
| Base 10 ppm PV3 | 7.3 |
| Treated 10 ppm PV2 | 3.3 |
| Treated 10 ppm PV3 | 3.1 |

Example 2

Removal of Arsenic

Arsenic concentrations of effluents from 250 ppb arsenic water flowing through sand packs made as by the same method as in EXAMPLE 1 was reduced to zero, and the arsenic concentration from an untreated 20/40 mesh (850/425 micron) sand pack was 170 ppb. Detailed results are shown in Table II. It is believed that other heavy metal ions in aqueous solutions may also be removed with a similar method.

TABLE II

Removal of Arsenic from Water Through Nanoparticle Coated Porous Media

| Arsenic Initial Concentration (ppb) | Arsenic Final Concentration After Base Sand Pack (ppb) | Arsenic Final Concentration After ConFINE ™ Coated Sand Pack (ppb) |
| --- | --- | --- |
| 100 | 89 | 10 |
| 250 | 163 | 0* |
| 250 | 175 | 0* |
| 500 | 443 | 0* |

*arsenic is undetectable

In the foregoing specification, it will be evident that various modifications and changes may be made thereto without departing from the broader spirit or scope of the invention as set forth in the appended claims. Accordingly, the specification is to be regarded in an illustrative rather than a restrictive sense. For example, specific combinations of alkaline earth metal oxides, alkaline earth metal hydroxides, alkali metal oxides, alkali metal hydroxides, transition metal oxides, transition metal hydroxides, post-transition metal oxides, post-transition metal hydroxides, piezoelectric crystals, and pyroelectric crystals, of various sizes; brines; base fluids; substrates; bed and pack particles (sand, ceramic or glass beads, gravel); coating agents (glycols, alcohols, mineral oils) and other components falling within the claimed parameters, but not specifically identified or tried in a particular composition, are anticipated to be within the scope of this invention.

The present invention may suitably comprise, consist or consist essentially of the elements disclosed and may be practiced in the absence of an element not disclosed. In a non-limiting example the method for filtering contaminants from a fluid may consist of or consist essentially of contacting the fluid containing the contaminants with a structure consisting of or consisting essentially of the substrate and the plurality of nanoparticles coated on the substrate as defined in the claims, and then at least partially filtering the contaminants from the fluid by an association of the nanoparticles with the contaminants.

The words "comprising" and "comprises" as used throughout the claims is to interpreted "including but not limited to".

What is claimed is:

1. A method for removing contaminants from a fluid originating from a subterranean reservoir comprising:
    contacting the subterranean reservoir fluid containing contaminants of at least one type with a structure comprising a substrate and a plurality of nanoparticles coated on the substrate, where the nanoparticles:
        have a mean particle size of less than 500 nm,
        are selected from the group consisting of alkaline earth metal oxides, alkaline earth metal hydroxides, alkali metal oxides, alkali metal hydroxides, transition metal oxides, transition metal hydroxides, post-transition metal oxides, post-transition metal hydroxides, piezoelectric crystals, pyroelectric crystals, and mixtures thereof, where if the contaminant comprises a metal, the metal is different than the metal in the particles, and
        are present in an amount effective to at least partially remove the contaminants from the fluid; and
    at least partially removing the contaminants from the subterranean reservoir fluid by an association of the nanoparticles with the contaminants.

2. The method of claim 1 where the subterranean reservoir fluid is aqueous.

3. The method of claim 1 where the substrate is selected from the group of structures consisting of proppants, gravel, beads, screens, slotted liners, packed and consolidated metal beads, foams, relative permeability additives, resins, rock formations, substrate particles having a mean particle size between about 45 to about 2000 microns, and combinations thereof.

4. The method of claim 1 where the contaminants are selected from the group consisting of sediments, soil particles, mining particles, water treatment particles, heavy metals, heavy metal compounds, heavy metal complexes, radioactive metals, radioactive compounds, radioactive complexes and combinations thereof.

5. The method of claim 4 where the heavy metal is selected from the group consisting of mercury, arsenic, cadmium, uranium, plutonium, lead, vanadium, tungsten, cobalt, copper, iron, manganese, zinc, molybdenum, selenium, and combinations thereof.

6. The method of claim 1 where in the nanoparticles:
    the alkali metal is selected from the group consisting of lithium, sodium, potassium,
    the alkaline earth metal is selected from the group consisting of magnesium, calcium, strontium, and barium,
    the transition metal is selected from the group consisting of titanium, zirconium, cobalt, nickel, and zinc, and
    the post-transition metal is aluminum, and mixtures thereof.

7. The method of claim 1 where the mean particle size of the nanoparticles is 250 nanometers or less.

8. The method of claim 1 further comprising at least partially coating the substrate with a coating agent comprising a carrier fluid selected from the group consisting of alcohol, glycol, polyol, vegetable oil, mineral oil, and combinations thereof, and the nanoparticle.

9. A method for removing contaminants from a fluid comprising:
    contacting the fluid containing contaminants of at least one type with at least one nanoparticle-coated substrate, where the at least one nanoparticle-coated substrate is adjacent to or within a subterranean reservoir, where the nanoparticles:
        have a mean particle size of less than 500 nm,
        are selected from the group consisting of alkaline earth metal oxides, alkaline earth metal hydroxides, alkali metal oxides, alkali metal hydroxides, transition metal oxides, transition metal hydroxides, post-transition metal oxides, post-transition metal hydroxides, piezoelectric crystals, pyroelectric crystals, and mixtures thereof, where if the contaminant comprises a metal, the metal is different than the metal in the particles, and
        are present in an amount effective to at least partially remove the contaminants from the fluid; and
    where the substrate is selected from the group of structures consisting of proppants, gravel, beads, screens, slotted liners, packed and consolidated metal beads, foams, relative permeability additives, resins, rock formations, substrate particles having a mean particle size between about 45 to about 2000 microns, and combinations thereof; and
    at least partially removing the contaminants from the fluid by an association of the nanoparticles with the contaminants, where the contaminants are selected from the group consisting of sediments, soil particles, mining particles, water treatment particles, heavy metals, heavy metal compounds, heavy metal complexes, radioactive metals, radioactive compounds, radioactive complexes and combinations thereof.

10. The method of claim 9 where the fluid is aqueous.

11. The method of claim 9 where the heavy metal is selected from the group consisting of mercury, arsenic, cadmium, uranium, plutonium, lead, vanadium, tungsten, cobalt, copper, iron, manganese, zinc, molybdenum, selenium, and combinations thereof.

12. The method of claim 9 where in the nanoparticles:
    the alkali metal is selected from the group consisting of lithium, sodium, potassium,
    the alkaline earth metal is selected from the group consisting of magnesium, calcium, strontium, and barium,
    the transition metal is selected from the group consisting of titanium, zirconium, cobalt, nickel, and zinc, and
    the post-transition metal is aluminum, and mixtures thereof.

13. The method of claim 9 where the mean particle size of the nanoparticles is 250 nanometers or less.

14. The method of claim 9 where the substrate coated with nanoparticles exists at a location selected from the group consisting of a subterranean reservoir, a wellbore adjacent the subterranean reservoir, and combinations thereof, and the fluid is produced from the subterranean reservoir.

15. The method of claim 9 further comprising at least partially coating the substrate with a coating agent comprising a carrier fluid selected from the group consisting of alcohol, glycol, polyol, vegetable oil, mineral oil, and combinations thereof, and the nanoparticles.

16. A method for removing dangerous or undesirable contaminants from a fluid produced from a subterranean reservoir, the method comprising:
placing at least one nanoparticle-coated substrate adjacent to or within the subterranean reservoir, where the nanoparticles on the substrate comprise a plurality of particles:
having an average particle size of less than 1000 nanometers, and
selected from the group consisting of alkaline earth metal oxides, alkaline earth metal hydroxides, transition metal oxides, transition metal hydroxides, post-transition metal oxides, post-transition metal hydroxides, piezoelectric crystals, pyroelectric crystals, and mixtures thereof;
contacting the nanoparticle-coated substrate with a fluid originating from within the subterranean reservoir, where the fluid comprises:
a carrier selected from the group consisting of water, hydrocarbons, and mixtures thereof; and
at least one dangerous or undesirable contaminant; and
at least partially removing the at least one dangerous or undesirable contaminant from the fluid by an association of the nanoparticles with the contaminant.

17. The method of claim 16 where the substrate is selected from the group of structures consisting of proppants, gravel, beads, screens, slotted liners, packed and consolidated metal beads, foams, relative permeability additives, resins, rock formations, substrate particles having a mean particle size between about 45 to about 2000 microns, and combinations thereof.

18. The method of claim 16 where in the nanoparticles:
the alkali metal is selected from the group consisting of lithium, sodium, potassium,
the alkaline earth metal is selected from the group consisting of magnesium, calcium, strontium, and barium,
the transition metal is selected from the group consisting of titanium, zirconium, cobalt, nickel, and zinc, and
the post-transition metal is aluminum, and mixtures thereof.

19. The method of claim 16 where the mean particle size of the nanoparticles is 500 nanometers or less.

20. The method of claim 16 where the fluid is selected from the group consisting of water, hydrocarbons and mixtures thereof.

* * * * *